(12) United States Patent
Milanfar et al.

(10) Patent No.: US 11,178,430 B2
(45) Date of Patent: Nov. 16, 2021

(54) ADAPTIVE DCT SHARPENER

(71) Applicant: Google LLC, Mountain View, CA (US)

(72) Inventors: Peyman Milanfar, Menlo Park, CA (US); Feng Yang, Mountain View, CA (US); Sungjoon Choi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/210,900

(22) Filed: Dec. 5, 2018

(65) Prior Publication Data

US 2020/0186836 A1 Jun. 11, 2020

(51) Int. Cl.
*H04N 19/625* (2014.01)
*H04N 19/124* (2014.01)
*H04N 19/184* (2014.01)

(52) U.S. Cl.
CPC ......... *H04N 19/625* (2014.11); *H04N 19/124* (2014.11); *H04N 19/184* (2014.11)

(58) Field of Classification Search
CPC ... H04N 19/625; H04N 19/124; H04N 19/184
See application file for complete search history.

(56) References Cited

U.S. PATENT DOCUMENTS

| | | | | |
|---|---|---|---|---|
| 2004/0196903 A1* | 10/2004 | Kottke | ................ | H04N 19/147 375/240.03 |
| 2012/0201476 A1* | 8/2012 | Carmel | ................ | H04N 19/60 382/239 |
| 2013/0051694 A1 | 2/2013 | Ayzenberg | | |
| 2019/0289296 A1* | 9/2019 | Kottke | ................ | G06T 7/0002 |

OTHER PUBLICATIONS

"Image Enhancement Using a Contrast Measure in the Compressed Domain", Tang et al., IEEE Signal Processing Letters, vol. 10, No. 10, Oct. 2003.
"Enhancement of Color Images by Scaling the DCT Coefficients and Interpolation", Alias et al., International Journal of Computer Applications, vol. 60, No. 8, Dec. 2012.

(Continued)

*Primary Examiner* — Hesham K Abouzahra
(74) *Attorney, Agent, or Firm* — McDonnell Boehnen Hulbert & Berghoff LLP

(57) ABSTRACT

Methods are provided for sharpening or otherwise modifying compressed images without decompressing and re-encoding the images. An overall image quality is determined based on the source of the compressed image, the quantization table of the compressed image, or some other factor(s), and a set of scaling factors corresponding to the image quality is selected. The selected scaling factors are then applied to corresponding quantization factors of the image's quantization table or other parameters of the compressed image that describe the image contents of the compressed image. The scaling factors of a given set of scaling factors can be determined by a machine learning process that involves training the scaling factors based on training images determined by decompressing and then sharpening or otherwise modifying a source set of compressed images. These methods can provide improvements with respect to encoded image size and computational cost of the image modification method.

20 Claims, 6 Drawing Sheets

(56) References Cited

OTHER PUBLICATIONS

K. Konstantinides et al., "Image sharpening in the JPEG domain," IEEE Transactions On Image Processing, vol. 8, No. 6, Jun. 1, 1999, pp. 874-878.
A. Nosratinia, "Enhancement of JPEG-Compressed Images By Re-Application of JPEG," Journal of VLSI Signal Processing Systems for Signal, Image, and Video Technology, Springer, New York, NY, US, vol. 27, No. 1/02, Feb. 1, 2001, pp. 69-79.
Miguel Onofre Martinez-Rach et al., "Impact of dead zone size on the rate/distortion performance of wavelet-based perceptual image encoders", 2016 5th International Conference On Multimedia Computing and Systems (ICMCS), IEEE, Sep. 29, 2016 (Sep. 29, 2016), pp. 65-70.
International Search Report and Written Opinion, dated Aug. 17, 2020, in International Patent Application No. PCT/US2019/045257.

\* cited by examiner

ADAPTIVE DCT SHARPENER

BACKGROUND

Digital images may be compressed in order to provide advantages such as reducing the costs of storage and/or transmission of the digital images. A variety of lossy and lossless methods for image compression exist. Lossy image compression methods result in a compressed version of an input image that cannot be used to regenerate the input image exactly. Nonetheless, such lossy compression methods permit the generation of output images that appear sufficiently similar to the input image to human perception so as to be acceptable in at least some contexts. Some lossy image compression techniques may permit this degree of similarity to be traded for increased compression ratios, allowing for smaller compressed image file sizes in return for reduction in the image quality of the output, compressed image.

SUMMARY

An aspect of the present disclosure relates to a method for efficiently enhancing (e.g., improving the sharpness of) compressed images, the method including: (i) obtaining an encoded image that includes (a) a set of coefficients indicative of image contents of the encoded image at respective spatial frequencies and (b) a set of quantization factors indicative of the degree of scaling applied to respective coefficients of the set of coefficients; (ii) obtaining a quality value for the encoded image; (iii) based on the quality value, selecting a set of scaling factors from a plurality of sets of scaling factors; (iv) generating a modified encoded image by applying the selected set of scaling factors to scale the set of quantization factors of the encoded image; and (v) transmitting an indication of the modified encoded image to a requestor device.

Another aspect of the present disclosure relates to a method including: (i) obtaining a training set of images, wherein each image in the training set of images has a respective quality value; (ii) selecting, based on the quality values of the images in the training set, one or more images from the training set that have respective quality values that correspond to a particular quality value; and, for each given image of the one or more images: (iii) obtaining an encoded version of the given image and a reference version of the given image, wherein the encoded version of the given image includes (i) a set of coefficients indicative of image contents of the given image at respective spatial frequencies and (ii) a set of quantization factors indicative of the degree of scaling applied to respective coefficients of the set of coefficients; (iv) applying a set of scaling factors that correspond to the particular quality value to scale the set of quantization factors of the encoded version of the given image; (v) generating an enhanced decoded version of the given image by decoding the set of coefficients using the quantization factors that have been scaled by the set of scaling factors; (vi) comparing the enhanced decoded version of the given image to the reference version of the given image; and (vii) updating the set of scaling factors based on the comparison between the enhanced decoded version of the given image and the reference version of the given image.

Yet another aspect of the present disclosure relates to a non-transitory computer-readable medium, configured to store at least computer-readable instructions that, when executed by one or more processors of a computing device, cause the computing device to perform computer operations including: (i) obtaining an encoded image that includes (a) a set of coefficients indicative of image contents of the encoded image at respective spatial frequencies and (ii) a set of quantization factors indicative of the degree of scaling applied to respective coefficients of the set of coefficients; (ii) obtaining a quality value for the encoded image; (iii) based on the quality value, selecting a set of scaling factors from a plurality of sets of scaling factors; (iv) generating a modified encoded image by applying the selected set of scaling factors to scale the set of quantization factors of the encoded image; and (v) transmitting an indication of the modified encoded image to a requestor device.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
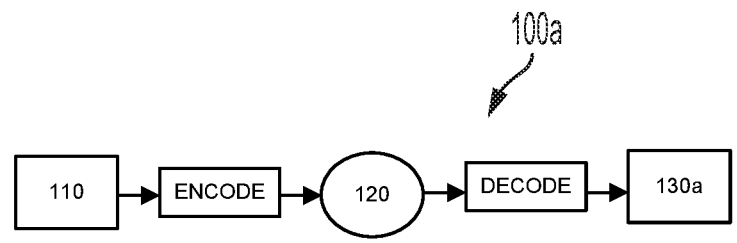
FIG. 1A a flowchart of a method, according to an example embodiment.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. OVERVIEW

In a variety of applications, it can be beneficial to encode images or other information such that the images or other information can be reduced in size. As a result of such encoding, less storage space and/or bandwidth can be used to store, transmit, copy, or otherwise manipulate or use the images or other information. The encoding (or compression) can be lossless or lossy. Lossless compression reduces the size of the information in a manner that permits the information to be later restored, exactly, to its pre-compression state. Lossy compression does not. Instead, lossy compression may permit a trade-off between the degree of compression possible and the "quality" of the image or other information that may be later recovered from the compressed version of the image or other information.

Such trade-offs can be implemented based on the intended use of the compressed information. For example, when compressing images, the compression method may take into account the properties of human vision (e.g., the increased sensitivity of the eye to luminance relative to chrominance) such that the compression process may discard or distort information from the image in ways that are less detectable by the human eye. Accordingly, the size of the compressed image may be reduced while maintaining an overall level of apparent image quality.

A compressed image (e.g., a JPEG image received from a user of a cloud audiovisual sharing service or a compressed frame of a video received from such a user) can be processed in order to improve the image represented by the compressed image. For example, the compressed image could be decompressed and/or decoded, and the decoded image could then be sharpened, blurred, or otherwise filtered and/or enhanced according to an application. For example, these image processing steps could be performed in order to improve the appearance of images used as thumbnails, such as thumbnails provided as part of a video sharing service in order to provide an indication of the contents of shared videos. The filtered image could then be compressed in order to reduce the space required to store the image and/or to reduce the bandwidth required to transmit the image to those who request the image (e.g., to devices being used to browse a video sharing website).

However, such a filtered-and-recompressed image may have a larger size than the source compressed image. This could be due to the filtering process reducing the "compressibility" of the image (e.g., by introducing high-spatial-frequency information), the compressing and decompression process introducing artifacts (e.g., edge artifacts at the boundaries between tiles of the decompressed image), or some other mechanisms. Accordingly, it could be beneficial to implement such sharpening, filtering, or other enhancement steps directly on the compressed image, without first decompressing the compressed image and then, subsequent to the filtering, re-compressing the image. Such a method could additionally have benefits with respect to computational cost (e.g., due to removing the decompression and re-compression steps).

Such a method could include performing sharpening, enhancement, or other image processing functions on an encoded (e.g., compressed) image by directly modifying parameters (e.g., quantization factors of a quantization table, discrete cosine transform coefficients) of the compressed image that are indicative of the image contents, e.g., in a spatial frequency domain, a kernel domain, an image pyramid domain, or in some other format or domain that indicates the contents of the image in some other manner that facilitates encoding and decoding of the image. For example, the encoded version of an image could include a set of coefficients representing the contents of the image at respective spatial frequencies (e.g., different spatial frequencies in two or more directions relative to the frame of the image) and a set of quantization factors (e.g., forming part of a quantization table of the encoded image) that indicate a degree of scaling that was applied to the coefficients during encoding (e.g., prior to a quantization step of a lossy encoding procedure) and that may be applied (e.g., in the inverse) to decode the coefficients in order to generate a decoded image.

In an example implementation, the quantization factors and/or coefficients could be scaled or otherwise manipulated to effect a sharpening, blurring, enhancement, or other modification of the image generated when the scaled (or otherwise manipulated) quantization factors are applied to the coefficients in order to decode the encoded image. The size of the modified encoded image could be substantially similar (e.g., identical) to the size of the encoded image prior to the scaling because the encoded image has not been decoded and subsequently re-encoded. The set of scaling factors applied to scale the quantization factors (e.g., discrete cosine transform coefficients) could be selected, from among a number of potential sets of scaling coefficients, based on one or more properties of the encoded image. For example, the set of scaling coefficients could be selected based on the quality of the image. In particular, it can be beneficial to sharpen or otherwise enhance images having different quality levels in different ways, e.g., such that lower-quality images are subjected to a greater magnitude of sharpening and/or to scaling to different degrees at different spatial frequencies.

The sets of scaling factors could be generated in a variety of ways. In some examples, the sets of scaling factors could be determined manually. Additionally or alternatively, an automated algorithm could be applied to generate a set of scaling factors. For example, a gradient descent, genetic algorithm, or other method could be applied to determine a set of scaling factors, e.g., by acting to minimize a determined difference between decoded-and-sharpened (or otherwise enhanced) versions of encoded images and versions of those encoded images that were decoded following application of the scaling factors. In order to use such methods to train a set of scaling factors, a set of encoded images having similar quality values (e.g., having quality values within a range of a specified quality value) could be used to train a set of scaling factors that could then be used to scale additional encoded images having quality values corresponding to the quality values of the set of encoded images. A number of sets of scaling factors, corresponding to respective different quality values and/or ranges of quality values, could be trained according to such a method.

It should be understood that the above embodiments, and other embodiments described herein, are provided for explanatory purposes, and are not intended to be limiting.

II. EXAMPLE IMAGE IMPROVEMENT IN ENCODING SPACE

In order to reduce the space used to store an image, to reduce the bandwidth used to transmit an image, or to provide some other benefit, the image can be encoded (e.g., compressed) in order to reduce the size of the image. Such encoding can be lossless (in which can the original image can be recovered without modification by decoding the encoded image) or lossy (in which case the image generated by decoding the encoded image differs from the original image).

An image encoding process is illustrated by way of example in FIG. 1A, which illustrates an example process 100a of encoding ("ENCODE") a source image 110 to generate an encoded image 120. The encoded image 120 can then be stored, transmitted, copied, or used in some other way. The encoded image 120 (e.g., a copy of the encoded image 120 transmitted to a device after having transmitted a request for such) can then be decoded ("DECODE") to generate a decoded image 130a. Such decoding can be performed, e.g., by a requestor device that transmitted a request to a server or other system that has stored thereon the encoded image 120. Accordingly, a representation of the source image 110 (e.g., a version that has a decreased resolution, a decreased color depth, that exhibits compression artifacts, or that differs in some other manner related to the encoding and decoding processes) is made available to the requestor device while using less bandwidth than would be used to transmit the uncompressed source image 110.

Once an image is encoded, the image contents of the source image (e.g., contents of a particular tile or region of the image at a number of different spatial frequencies) can be represented in the encoded image in a variety of ways. For example, discrete cosine transform coefficients, kernel coefficients, values representative of a filtered version of local regions of the source image, or some other representation of the source image could be contained within the encoded image. These representative values could be the result of rounding, quantization, sparsification, maximum or minimum operations, or some other operations that result in the loss of some information about the source image, e.g., in order to facilitate compression of the source image into an encoded image that is smaller in size than the source image. The encoded image may additionally include quantization factors (e.g., stored in a quantization table) or some other information that is indicative of the method used to encode and/or decode the coefficients. Thus, such quantization factors or other information are also representative of the image contents, as this information is needed to generate, from the coefficients, image-domain information (e.g., pixel values) about the encoded image.

Figure 1B:
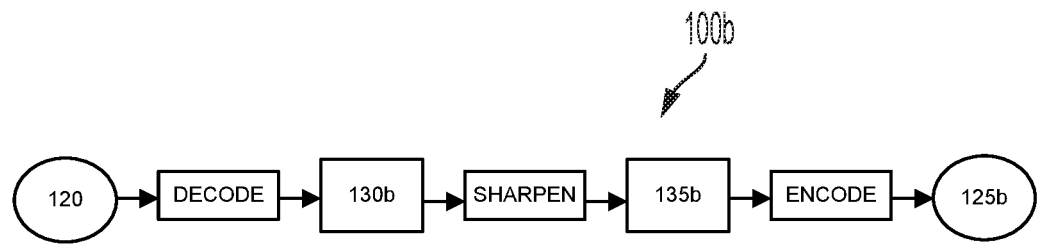
FIG. 1B a flowchart of a method, according to an example embodiment.

Certain image processing tasks may be performed on the encoded image by decoding the encoded image, performing the image processing on the decoded image (e.g., sharpening, blurring, filtering, enhancement, or some other image manipulation task), and then encoding the processed decoded image. This is illustrated by way of example in FIG. 1B, which illustrates an example process 100b of decoding ("DECODE") an encoded image 120 to generate a decoded image 130b. The decoded image 130b is then sharpened ("SHARPEN") or subjected to some other image processing task. The sharpened decoded image 135b is then encoded ("ENCODE") to generate a sharpened encoded image 125b. The sharpened encoded image 125b can then be used, e.g., transmitted to a requestor device that transmitted a request to a server or other system that has stored thereon the sharpened encoded image 125b.

Such sharpening or other image processing tasks could be performed in order to enhance images that are used as thumbnails. Such thumbnails could be, for example, low-quality images extracted from frames of a video or video stream. Thumbnails could be presented on a search website, a video hosting website, or some other service where encoded images are transmitted to requestor devices. By performing the sharpening or other image processing step on the encoded images, and the re-encoding them, the thumbnails or other sharpened encoded images provided may be more aesthetically pleasing or otherwise improved relative to the encoded, non-processed images. By improving the aesthetic or other properties of the images, the likelihood that a user will interact with the images (e.g., to access a video represented by the sharpened encoded image) can be increased.

However, encoded processed images generated by such a process (of decoding, image processing, and re-encoding) may be larger in size than the encoded images from which they are generated. This can be due to the image processing reducing the "compressibility" of the decoded image (e.g., by introducing high-spatial-frequency information), the encoding and decoding process introducing artifacts that increase the size of the processed encoded image (e.g., edge artifacts at the boundaries between tiles of the decoded image), or some other mechanisms. Additionally, the process of decoding and re-encoding the images can have a high computational cost.

Accordingly, it could be beneficial to implement enhancement (e.g., sharpening) or other image processing on an encoded image without decoding the image first, e.g., by operating directly on the quantization factors of the encoded image that are used to decode the encoded image and that thus represent the image contents of the encoded image. Such a method could reduce the computational cost of sharpening or applying some other image processing to encoded images (e.g., by avoiding the decoding and re-encoding steps). Further, such a method could reduce the size of the resulting processed encoded images, for example, by manipulating the quantization factors or other contents of the encoded image "in place" (e.g., by scaling) such that the processed encoded image is substantially the same size as (e.g., identically the same size as) the encoded image, by avoiding encoding compression artifacts that may be present in the decoded version of the encoded image, or due to some other factor(s).

Figure 1C:
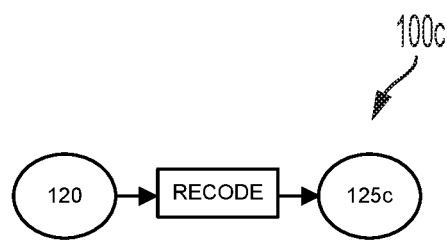
FIG. 1C a flowchart of a method, according to an example embodiment.

FIG. 1C illustrates an example process 100c of recoding ("RECODE") an encoded image 120 to generate a sharpened or otherwise enhanced encoded image 125c. A decompressed image generated by decoding the sharpened encoded image 125c could be enhanced with respect to sharpness, aesthetic qualities, or some other factor of interest relative to a decompressed image generated by decoding the encoded image 120. The sharpened encoded image 125c can then be used, e.g., transmitted to a requestor device that transmitted a request to a server or other system that has stored thereon the encoded sharpened image 125c.

There are a variety of ways to implement such a method of "recoding" an encoded image to effect certain desired changes (e.g., an increased sharpness and/or aesthetic quality) in the image that can be generated by decoding the encoded image without decoding and then re-encoding the encoded image. Such methods could include applying scaling factors to coefficients, quantization factors, parameters, or other values of the encoded image that represent image contents of the decoded image, e.g., contents of the image at respective spatial frequencies and/or locations within the image, contents representing the similarity of contents of the image to respective kernel functions or filters at various locations within the image, contents representing the degree of scaling applied to contents of the image at respective spatial frequencies, or some other representation of the contents of the image in some space related to the method used to encode the source image. Such coefficients, quantization factors, parameters, or other values of the encoded image could be scaled (e.g., in a manner that is dependent on the spatial frequencies of the values) such that, when the encoded image is decoded (e.g., by applying a set of scaled quantization factors to re-scale other coefficients of the encode image), the resulting decoded image is improved with respect to sharpness, aesthetics, or some other factor(s) of interest relative to an image decoded from the source encoded image.

Sets of such scaling factors could be generated in a variety of ways. In some examples, the scaling factors could be determined manually, e.g., via a manual process of altering the scaling factors and observing the effects of such alteration on the resulting scaled decoded images. Additionally or alternatively, an automated method could be applied to generate such sets of scaling factors. Such a method could operate on sets of input images (e.g., input encoded images) to generate a set of scaling factors such that, when the scaling factors are applied to an encoded image, the decoded image generated therefrom comports with some desired image and/or image property.

For example, a 'reference image' could be obtained for each of the encoded images (e.g., by decoding and filtering the encoded images, by using raw or otherwise non-compressed images used to generate the encoded images, or some other method), and the scaled decoded image determined from a given encoded image could be compared to the reference image corresponding to the given image. The set of scaling factors used to generate the scaled decoded image could then be updated according to the comparison or according to some other factor of interest (e.g., a measure of the sharpness or contrast of the scaled decoded image). Gradient descent, genetic algorithms, or some other machine learning techniques could be applied to update the set of scaling factors.

Each scaling factor of such a set of scaling factors could correspond to one or more of the quantization factors, coefficients, parameters, or other values of an encoded image that represent image contents of the encoded image and/or that represent the method used to encode and/or decode the image. In some examples, an encoded image could have sets of coefficients that each represent image contents (e.g., contents at respective spatial frequencies) of the encoded image within respective different regions of the encoded image (e.g., non-overlapping image tiles). An encoded image may additionally include one or more sets of quantization factors that represent the degree of scaling applied to such coefficients in order to encode the image (e.g., a degree of scaling applied prior to a quantization step) and/or a degree of scaling applied to such coefficient in order to decode the image. A set of scaling factors could be generated such that an individual scaling factor is determined for each of the quantization factors. Alternatively, each scaling factor of a set of scaling factors could correspond to a subset of the quantization factors, e.g., according to spatial frequency, orientation, kernel size, or some other characteristic of the quantization factors.

For example, each region of an encoded image (e.g., encoded according to the JPEG image compression format) could be represented by a set of coefficients indicative of contents of the encoded image at respective spatial frequencies (e.g., discrete cosine transform coefficients at a number of different spatial frequencies). In order to decode the encoded image, each of the coefficients within each of the sets of coefficients could be scaled to a degree specified by a respective quantization factor of the encoded image. A set of N scaling factors, each factor corresponding to a respective different spatial frequency (e.g., a scale of frequencies from DC to the highest spatial frequency representable by each region of the encoded image) could be applied to the quantization factors. Each one of the scaling factors could be applied to a respective set of the quantization factors of the encoded image that correspond to the scaling factor with respect to spatial frequency. These scaled quantization factors could then be applied to re-scale the coefficients of the encoded image in order to decode the encoded image.

In an example, an encoded image could be encoded according to the JPEG image compression format such that each eight-by-eight pixel region (or tile) of the source image is represented, in the encoded image, by an eight-by-eight set of discrete cosine transform coefficients (some of which may be omitted from explicit expression within the encoded image, due to quantization, run-length encoding, or other factors). The encoded image additionally includes a quantization table that contains a set of quantization factors indicative of the degree to which each region's coefficients should be scaled in order to decode the encoded image. Each of the eight-by-eight set of discrete cosine transform coefficients represents the contents within the corresponding set of pixels of the source image at a respective spatial frequency, e.g., a first coefficient represents the DC component of the source image, a second represents a first, lowest frequency in the horizontal direction and DC in the vertical, a third represents a second, higher frequency in the horizontal direction and DC in the vertical, a further coefficient represents the first, lowest frequency in vertical direction and DC in the horizontal, yet another coefficient represents the first, lowest frequency in both the vertical and horizontal directions, etc. Accordingly, a first scaling factor could be applied to those quantization factors used to scale coefficients representing DC spatial frequencies, a second scaling factor could be applied to those quantization factors used to scale coefficients representing the first, lowest spatial frequency, etc.

In such an example, where the regions (e.g., eight-by-eight pixel regions) of a source image are represented in an encoded image by corresponding eight-by-eight sets of coefficients (e.g., discrete cosine transform coefficients), the set of scaling factors could include eight scaling factors for each spatial frequency from DC to the highest frequency represented in the eight-by-eight set of coefficients. In another example, independent scaling factors could be determined for horizontal and vertical spatial frequencies. In such an example, the set of scaling factors could include 15 scaling factors (with the horizontal and vertical DC spatial frequencies represented by a single "DC" scaling factor). Alternatively, an independent scaling factor could be determined for each coefficient in the eight-by-eight set of coefficients. One of skill in the art will recognize that these examples, based on eight-by-eight sets of coefficients and/or eight-by-eight pixel regions, may be adapted to other sizes and shapes of regions and/or corresponding sets of coefficients.

The ability of such sets of scaling factors to effectively sharpen or otherwise enhance encoded images could be related to the overall "quality" of the encoded images. For example, lower-quality encoded images (e.g., encoded images obtained by extracted frames from an uploaded video file) could be sharpened or otherwise enhanced by scaling up high-spatial-frequencies more than could higher-quality encoded images (e.g., encoded images generated by a user operating a still-image camera and uploaded them to serve as the thumbnail for a video also uploaded by the user). Accordingly, different sets of scaling factors could be determined for different "quality values" of images. For example, subsets of encoded images could be selected, based on quality value, from a set of training images and each subset could be used to train (e.g., via an automated machine learning process) a set of scaling factors corresponding to the quality value of the subset of training images used for training.

A "quality value" of an encoded image could be defined and/or obtained in a variety of ways. In some examples, the quality value of a particular image could be determined based on the source of the image. For example, images extracted from video streams could be "low quality" images and images expressly received from users (e.g., to act as thumbnails for videos uploaded by those users) could be "high quality" images. In another example, the quality of an encoded image could be determined based on a property of the encoded image and/or of the decoded image represented thereby. For example, an amount of high-spatial frequency content of the encoded image, or a sharpness of an image decoded from the encoded image, could be determined and used to generate a quality value for the encoded image. In yet another example, the quality value could be an explicitly encoded parameter of the encoded image (e.g., EXIF data) and/or determined from the quantization factors of the image (e.g., from a quantization table containing such quantization factors) or other parameters describing the encoded image and/or the process(es) used to generate the encoded image.

These methods can be used to provide significant improvements in sharpening or otherwise enhancing images encoded according to the JPEG image compression format. When applied to "high quality" images (e.g., images received from users of a video sharing website to act as thumbnails for shared videos), the size of the encoded images sharpened using the methods described herein were typically 27% smaller than images sharpened by decoding an encoded image, applying a sharpening image process to the decoded image, and re-encoding the sharpened image. When applied to "low quality" images (e.g., images extracted from frames of video files received from users of a video sharing website), the size of the encoded images sharpened using the methods described herein were typically 29% smaller than images sharpened by decoding an encoded image, applying a sharpening image process to the decoded image, and re-encoding the sharpened image. Additionally, applying sets of scaling factors to the encoded images typically required 9% less computational time than decoding an encoded image, applying a sharpening image process to the decoded image, and re-encoding the sharpened image for both the high-quality and low-quality images.

III. EXAMPLE ENCODING AND DECODING

Images can be encoded such that the images are reduced in size. Accordingly less storage space and/or bandwidth can be used to store, transmit, copy, or otherwise manipulate or use the encoded images. This encoding (or compression) can be lossless or lossy. Lossy compression may permit a trade-off between the degree of compression possible and the "quality" of the image or other information that may be later recovered from the compressed version of the image or other information. Such trade-offs can be implemented based on knowledge about the way that the human visual system perceives images, such that aspects of the image to which the human eye is less sensitive may be more compressed without affecting the subjective experience of the decompressed image. For example, the encoding method may take into account the increased sensitivity of the human eye to luminance relative to chrominance by downsampling chrominance information, by reducing a bit depth at which chrominance information is stored relative to luminance information, and/or by using a different, lower-quality quantization table or other parameters for encoding the chrominance information relative to the luminance information. In another example, higher-spatial-frequency contents of the image may be quantized, rounded, or otherwise degrading during encoding to a greater degree than lower-spatial-frequency contents. Accordingly, the size of the compressed image may be reduced while maintaining an overall level of apparent image quality.

Encoding of an image may be partially implemented by first transforming the image into a different color representation. For example, an image with a red-green-blue (RGB) representation could be converted into a luminance-chrominance (YUV) representation. Alternatively or additionally, the encoding could involve downsampling the source image (e.g., downsampling the chrominance channels of the image), applying linear or nonlinear filters, quantizing/rounding the pixel values of the image, or performing some other manipulations on the image "in the image space" prior to applying any transformation of the image data from the two-dimensional pixel space of the image into a spatial frequency space or some other space. This pre-processed image data can then be translated into another domain, e.g., a spatial frequency domain where further compression may occur.

Such an alternative space may be chosen such that the representation of the image in the alternative space is "sparse." That is, the representation in the alternative space may include a small subset of representative coefficients that contain "most" of the image (e.g., that have substantially non-zero values) while a more numerous remainder subset of the representative coefficients have values at or near zero and thus represent a small portion of the image content of the source image. Accordingly, the remainder subset can be discarded, reducing the total size of the encoded image while maintaining the majority of the perceivable content of the source image. Such a process could include quantizing or otherwise rounding (e.g., rounding down) the coefficients, e.g., following a scaling process to emphasize those coefficients found to be more "important" to human visual perception (e.g., lower spatial frequencies). Such an alternative space could include a spatial frequency space (e.g., represented by discrete cosine transformation coefficients of the image-space data), a kernel-based space, or some other transform space.

Figure 2A:
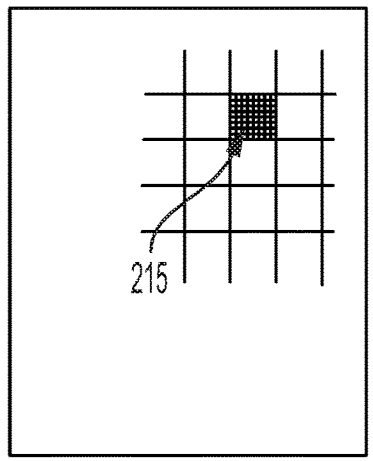
FIG. 2A illustrates an example image.

FIG. 2A illustrates an example image 200, or a particular color channel of such an image (e.g., luminance channel, a chrominance channel), that could be encoded. The image 200 is composed of a plurality of pixels (a sample of which are illustrated by the small squares in FIG. 2A. In order to encode (e.g., to compress) the image 200 (e.g., according to the JPEG image compression format), non-overlapping sets of the pixels (e.g., the example set 215 shown in FIG. 2A) can be individually transformed (e.g., using the discrete cosine transform) into respective sets of coefficients in a transform domain. Performing such a transformation on restricted subsets of the image, rather than on the image as a whole (e.g., generating discrete cosine transform coefficients from the entirety of the image at once), can provide benefits with respect to memory usage, generalizability of the encoder (e.g., across images of different size), optimization of the encoder, or with respect to some other considerations related to the encoding of images. As shown, the non-overlapping sets are eight-by-eight tiles of pixels, but other shapes and sizes of non-overlapping sets could be used.

Figure 2B:
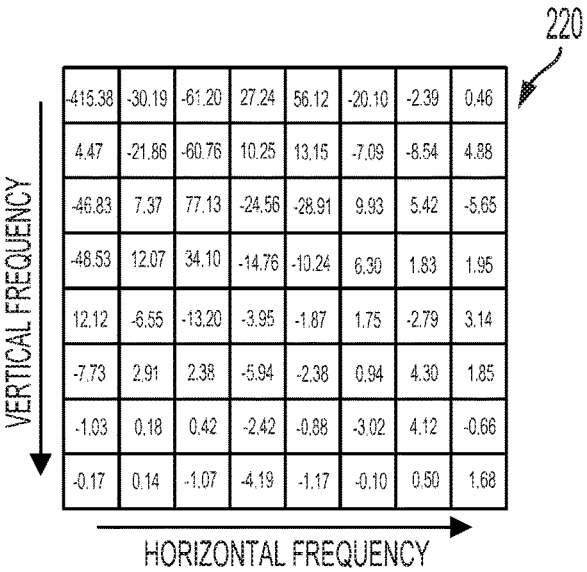
FIG. 2B illustrates an example frequency-based decomposition of a portion of the image of FIG. 2A.

The illustrated set of pixels 215 of the image 200 could be transformed into a set of coefficients that represent the contents of the set of pixels 215 at respective spatial frequencies. For example, the coefficients could be discrete cosine transform coefficients determined across a range of horizontal and vertical spatial frequencies. An example set of coefficients 220 is illustrated in FIG. 2B. Each coefficient represents the contents of the set of pixels 215 at a respective spatial frequency in the vertical and horizontal directions. For example, the top left coefficient ("−415") represents the DC content of the set of pixels 215. In another example, the fourth coefficient from the left in the top row ("56") represents content of the set of pixels 215 that does not vary vertically (i.e., that is DC with respect to the vertical direction) while varying at an intermediate spatial frequency horizontally.

In order to compress these coefficients, the coefficients may be rounded (e.g., rounded down). This could permit the bit depth of the values used to store the coefficients to be reduced. Additionally, coefficients that are rounded down to zero may be omitted from being expressly stored in the resulting encoded image (e.g., by employing a run-length encoding). To increase the level of compression, a set of quantization factors could be applied to scale the coefficients 220 prior to rounding down (or "quantizing") the scaled coefficients. Thus, the quantization factor indicates the degree of scaling to be applied to one or more of the coefficients 220. A single quantization factor could be applied to all of the coefficients. Alternatively, quantization factors from a quantization table could be applied individually to respective coefficients. The factors in such a quantization table can be specified, based on information about human subjective visual perception, to emphasize those coefficients found to be more "important" to human visual perception (e.g., lower spatial frequencies) by applying a smaller-magnitude scaling factor to such coefficients (thus preserving more of the information present in the coefficient by quantizing the coefficient according to a more finely graded scale). Conversely, "less important" coefficients may be de-emphasized by applying a larger-magnitude scaling factor to such coefficients (thus preserving less of the information present in the coefficient by quantizing the coefficient according to a more coarse scale and/or by increasing the likelihood that the coefficient will be omitted entirely by being rounded to zero).

Figure 2C:
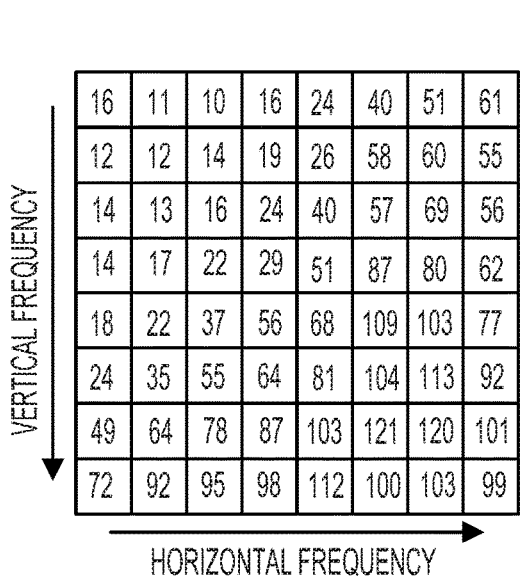
FIG. 2C illustrates an example quantization table.

FIG. 2C shows an example quantization table 230. Such a quantization table may be pre-specified by software used to generate encoded images (e.g., software running on a camera, software that is part of an image processing suite). A particular encoded image may include a copy of such a quantization table to facilitate decoding the encoded image. For example, a decoding software could multiply the image-content coefficients in the encoded image with corresponding elements of the quantization table 230 in order to "scale up" the quantized coefficients so that they may be transformed (e.g., via a discrete cosine transform) into pixel values of a decoded image (e.g., luminance values, chrominance values).

Figure 2D:
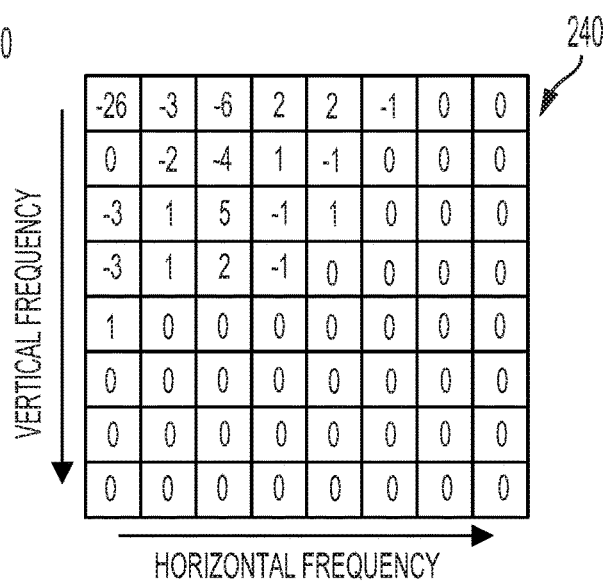
FIG. 2D illustrates the frequency-based decomposition of FIG. 2B following scaling and quantization.

FIG. 2D shows a set of quantized coefficients 240 that have been scaled by respective degrees according to the quantization table 230 (i.e., according to respective quantization factors within the quantization table 230) and then quantized (rounded down). Accordingly, most of the coefficients 240 have values of zero. Thus, the set of coefficients 240 may be efficiently stored using a run-length encoding. The run-length encoded coefficients may then be further compressed (e.g., using a lossless Huffman coding) before being contained within the final encoded image.

The methods described herein to improve the sharpness or to otherwise manipulate encoded images without decoding those images may be applied to the quantization factors (e.g., to the quantization table 230) of such an encoded image. This can include applying a set of scaling factors (e.g., according to correspondences between the spatial frequencies of the scaling factors and the spatial frequencies of the quantization factors within the quantization table 230) to modify the quantization factors such that, when the modified quantization factors are used to scale (e.g., to "scale up") the encoded coefficients 240 during decoding of the encoded coefficients 240, that decoded image generated therefrom is sharper or otherwise enhanced relative to an image generated using the un-modified quantization factors.

IV. EXAMPLE TRAINING OF SCALING FACTORS

The sets of scaling factors used to sharpen, enhance, or otherwise manipulate encoded images without fully decoding the encoded images could be generated in a variety of ways. In some examples, the sets of scaling factors could be determined manually. Additionally or alternatively, an automated algorithm could be applied to generate a set of scaling factors. Such an automated method could include using gradient descent, genetic algorithms, or some other machine learning methods to train the set of scaling factors such that, when decoded, encoded images whose quantization factors have been modified using the set of scaling factors generate decoded images that are improved with respect to some factor of interest. Such factors of interest could include a determined overall sharpness of the decoded image, a correspondence between the decoded image and a reference image generated in some other manner (e.g., a raw image used to generate the encoded image prior to application of the scaling factors, a decoded image sharpened or otherwise enhanced using conventional methods), or some other factor(s).

Figure 3:
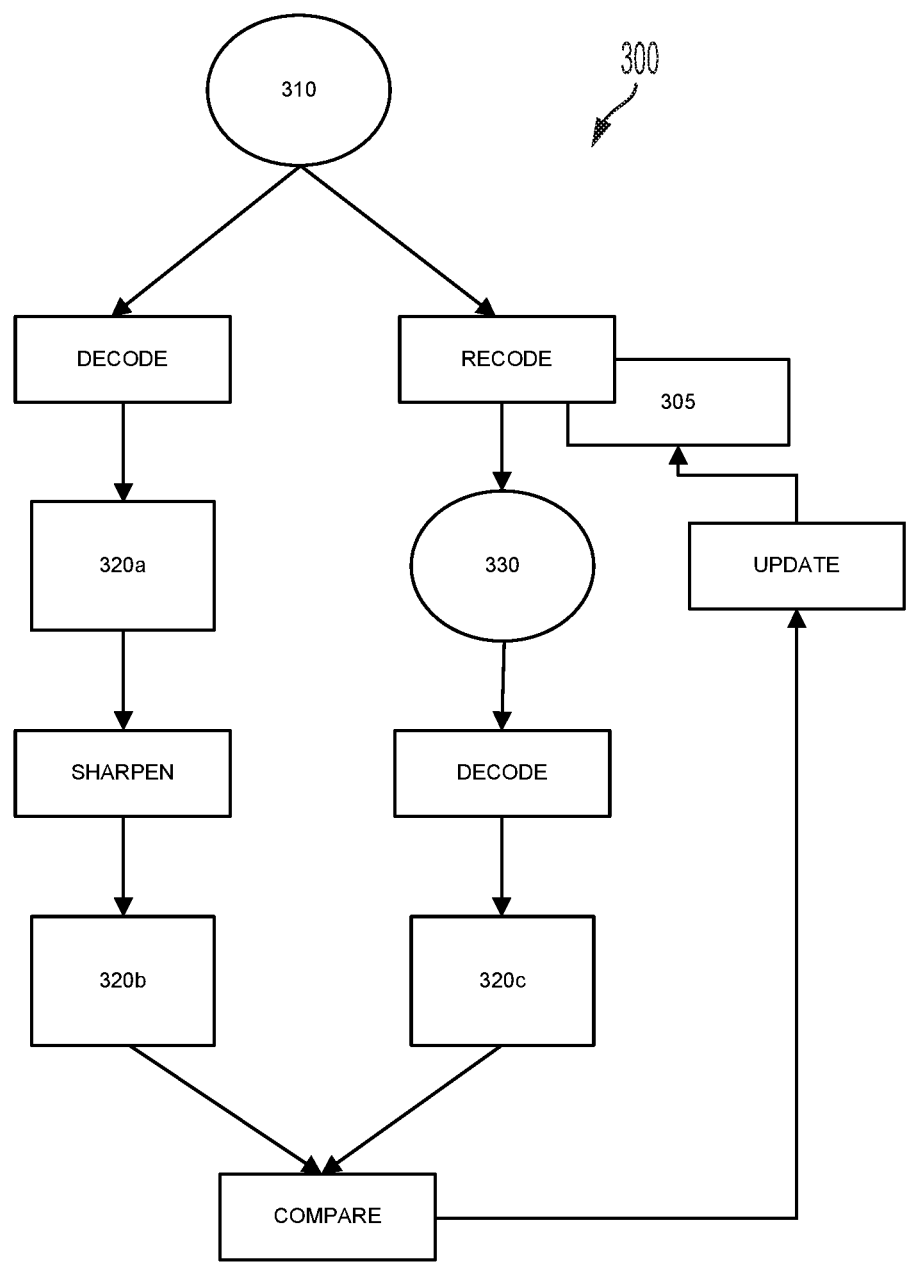
FIG. 3 is a flowchart of a method, according to an example embodiment.

FIG. 3 illustrates elements of a method 300 for generating such a set of scaling factors. An encoded image 310 (e.g., an encoded image selected from a set of encoded images) is decoded ("DECODE") to generate a decoded image 320a. The decoded image 320a is then sharpened ("SHARPEN") or otherwise processed according to an application to generate a reference image 320b that represents the desired effect of the set of scaling factors to be trained. Additional steps may be applied to generate the reference image 320b, e.g., the decoded sharpened image may be subjected to an additional compression and decoding to imitate the overall effect of an alternative decode-sharpen-encode process.

Quantization factors of the encoded image 310 are also scaled by applying a set of scaling factors 305 to the quantization factors (e.g., according to spatial frequency) to generate a modified encoded image 330. The modified encoded image 330 is then decoded ("DECODE") to generate a decoded modified image 320c. This can include using the scaled quantization factors to re-scale image-encoding coefficients of the encoded image (e.g., discrete cosine transform coefficients of the encoded image) prior to using a transform (e.g., the discrete cosine transform) to transform the re-scaled coefficients into pixel values (e.g., red-channel pixel values, luminance pixel values). This decoded modified image 320c is then compared ("COMPARE") to the reference image 320b to generate a measure of how effective the set of scaling factors 305 was in effecting the desired enhancement of the encoded image. Such a comparison could include determining a sum of squared differences between the pixels of the reference image 320b and the decoded modified image 320c (e.g., between the luminance and/or chrominance channels of the reference image 320b and the decoded modified image 320c) or performing some other comparison to generate feedback information that can be used to train the set of scaling factors.

The result of the comparison (e.g., the output of a cost function, gradient information, etc.) is then used to update ("UPDATE") the set of scaling factors 305. Such updating can be performed, based on the comparison, according to gradient descent, a genetic algorithm, or some other machine learning method. The process 300 can then be repeated to further update the set of scaling factors 305, e.g., until the set of scaling factors 305 converge.

Note that, while the method 300 illustrates the use of a single encoded image 310 to train a set of scaling factors 305, it is anticipated that a large set of encoded images (e.g., from an online database of such images) will be used to train the set of scaling factors 305. Accordingly, the method 300 may be performed on the plurality of encoded images to update the set of scaling factors serially (e.g., generating individual updates to the set of scaling factors based on the comparison data from a single encoded image) or in parallel (e.g., combining the comparison data from a set of encoded images to effect each individual update to the set of scaling factors).

Further, it is anticipated that sets of scaling factors generated according to the methods described herein (e.g., method 300) will be particularly suited to encoded images that are similar with respect to one or more factors to the set of encoded images used to train or otherwise generate the set of scaling factors. Accordingly, sets of encoded images could be selected, from a database of such encoded images, that are similar with respect to image content, image compression factors, image quality, or some other factor and the selected images could be used to generate a set of scaling factors that could then be applied to additional encoded images that correspond, with respect to the chosen factor, to the set of encoded images used to generate the set of scaling factors. Multiple different sets of scaling factors, corresponding to respective different ranges or values of the chosen factor, could be generated based on corresponding sets of encoded images.

For example, each encoded image in a database of encoded images could have a corresponding quality value. Such a "quality value" could be defined and/or obtained in a variety of ways. In some examples, the quality value of a particular image could be determined based on the source of the image. For example, images extracted from video streams could be "low quality" images and images expressly received from users (e.g., to act as thumbnails for videos uploaded by those users) could be "high quality" images. In another example, the quality of an encoded image could be determined based on a property of the encoded image and/or of the decoded image represented thereby. For example, an amount of high-spatial frequency content of the encoded image, or a sharpness of an image decoded from the encoded image, could be determined and used to generate a quality value for the encoded image. In yet another example, the quality value could be an explicitly encoded parameter of the encoded image (e.g., EXIF data) and/or determined from a quantization table or other parameters describing the encoded image and/or the process(es) used to generate the encoded image.

Multiple different sets of encoded images could then be selected, from a plurality of available encoded images, corresponding to such different quality values and/or different ranges of quality values. For example, a first set of encoded images could include encoded images extracted from video while a second set of encoded images could include images expressly provided by users to act as thumbnail images or to be otherwise used to indicate the content of a video. The multiple different sets of encoded images could then be used to generate respective different sets of scaling factors. Each set of generated scaling factors could then be applied to encoded images that correspond to the set of scaling factors with respect to quality value.

V. EXAMPLE SYSTEMS

Computational functions (e.g., functions to scale quantization factors of an encoded image according to a set of scaling factors, methods to generate sets of such scaling factors) described herein may be performed by one or more computing systems. Such a computing system may be integrated into or take the form of a computing device, such as a mobile phone, tablet computer, laptop computer, server, home automation element, standalone video capture and processing device, cloud computing network, and/or programmable logic controller. For purposes of example, FIG. 4 is a simplified block diagram showing some of the components of an example computing device 400.

By way of example and without limitation, computing device 400 may be a cellular mobile telephone (e.g., a smartphone), a video camera, a computer (such as a desktop, notebook, tablet, or handheld computer), a personal digital assistant (PDA), a wearable computing device, a server, a cloud computing system (e.g., a networked plurality of servers or other computational units), or some other type of device or combination of devices. It should be understood that computing device 400 may represent a physical device, a particular physical hardware platform on which applications operate in software, or other combinations of hardware and software that are configured to carry out mapping, training, and/or audio processing functions.

Figure 4:
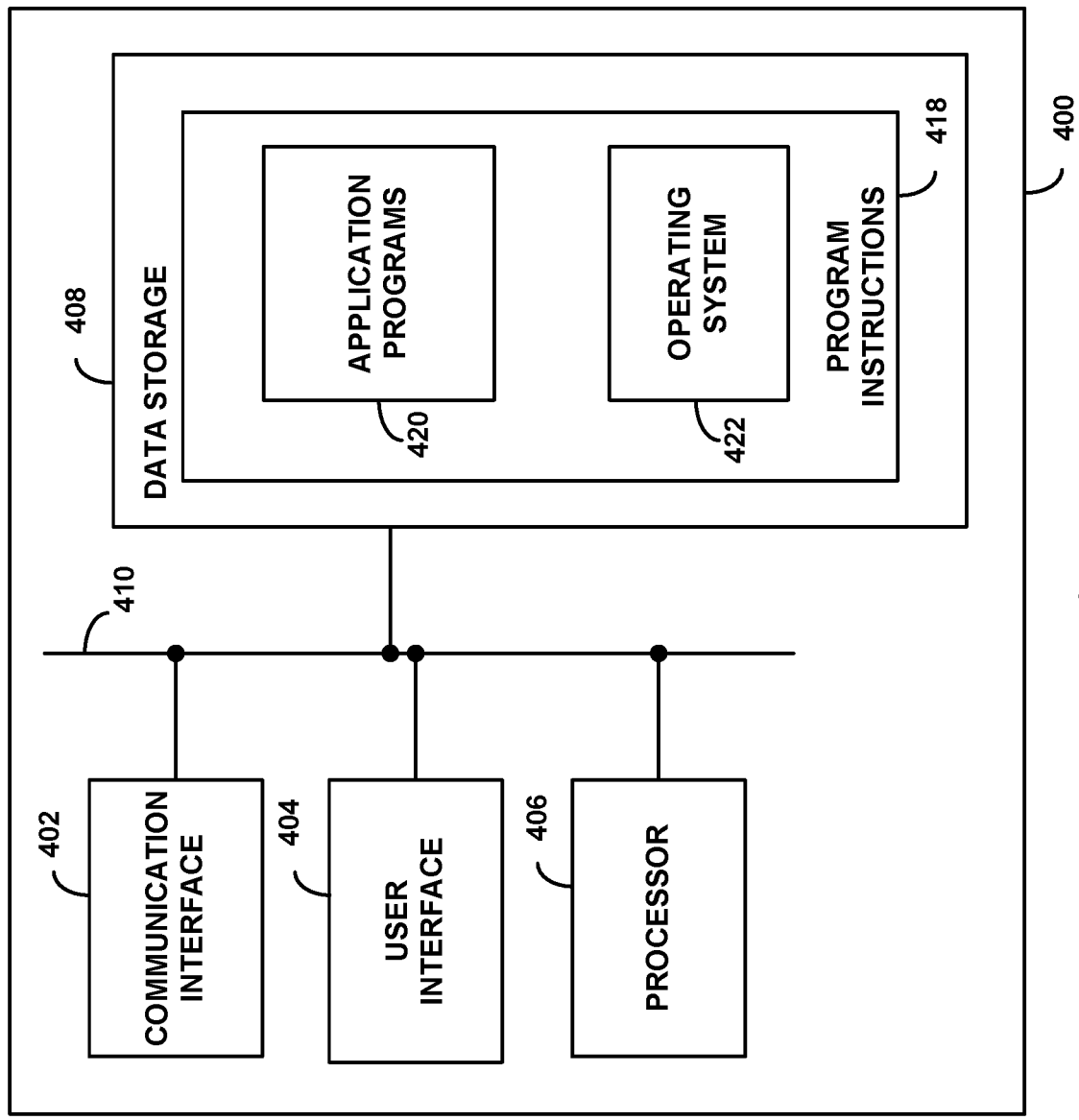
FIG. 4 is a simplified block diagram showing some of the components of an example system.

As shown in FIG. 4, computing device 400 may include a communication interface 402, a user interface 404, a processor 406, and data storage 408, all of which may be communicatively linked together by a system bus, network, or other connection mechanism 410.

Communication interface 402 may function to allow computing device 400 to communicate, using analog or digital modulation of electric, magnetic, electromagnetic, optical, or other signals, with other devices, access networks, and/or transport networks. Thus, communication interface 402 may facilitate circuit-switched and/or packet-switched communication, such as plain old telephone service (POTS) communication and/or Internet protocol (IP) or other packetized communication. For instance, communication interface 402 may include a chipset and antenna arranged for wireless communication with a radio access network or an access point. Also, communication interface 402 may take the form of or include a wireline interface, such as an ETHERNET, UNIVERSAL SERIAL BUS (USB), or High-Definition Multimedia Interface (HDMI) port. Communication interface 402 may also take the form of or include a wireless interface, such as a WIFI, BLUETOOTH®, global positioning system (GPS), or wide-area wireless interface (e.g., WIMAX or 3GPP LONG-TERM EVOLUTION (LTE)). However, other forms of physical layer interfaces and other types of standard or proprietary communication protocols may be used over communication interface 402. Furthermore, communication interface 402 may comprise multiple physical communication interfaces (e.g., a WIFI interface, a BLUETOOTH® interface, and a wide-area wireless interface).

In some embodiments, communication interface 402 may function to allow computing device 400 to communicate with other devices, remote servers, access networks, and/or transport networks. For example, the communication interface 402 may function to receive, from a requestor device (e.g., a cellphone, a desktop or laptop computer) a request for an image (e.g., an image of a website, an image used as a thumbnail to indicate the contents of a video related to other content requested by the requestor device), to transmit an indication of an encoded image that has been modified according to the methods described herein, to receive from a user an indication of an image to be used as a thumbnail for a video uploaded by the user, or some other information. For example, the computing device 400 could be a server, cloud computing system, or other system configured to perform the methods described herein and the remote system could be a cellphone, digital camera, or other device configured to request information (e.g., web pages that may have thumbnails or other images embedded therein) and to receive, from the computing device 400, one or more encoded images that may have been modified as described herein (e.g., to sharpen or otherwise enhance the encoded images without fully decoding the images) or to receive some other information from the computing device 400.

User interface 404 may function to allow computing device 400 to interact with a user, for example to receive input from and/or to provide output to the user. Thus, user interface 404 may include input components such as a keypad, keyboard, touch-sensitive or presence-sensitive panel, computer mouse, trackball, joystick, microphone, and so on. User interface 404 may also include one or more output components such as a display screen which, for example, may be combined with a presence-sensitive panel. The display screen may be based on CRT, LCD, and/or LED technologies, or other technologies now known or later developed. User interface 404 may also be configured to generate audible output(s), via a speaker, speaker jack, audio output port, audio output device, earphones, and/or other similar devices.

In some embodiments, user interface 404 may include a display that serves to present video or other images to a user. Additionally, user interface 404 may include one or more buttons, switches, knobs, and/or dials that facilitate the configuration and operation of the computing device 400. It may be possible that some or all of these buttons, switches, knobs, and/or dials are implemented as functions on a touch- or presence-sensitive panel.

Processor 406 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing and neural network computation, among other applications or functions. Data storage 408 may include one or more volatile and/or non-volatile storage components, such as magnetic, optical, flash, or organic storage, and may be integrated in whole or in part with processor 406. Data storage 408 may include removable and/or non-removable components.

Processor 406 may be capable of executing program instructions 418 (e.g., compiled or non-compiled program logic and/or machine code) stored in data storage 408 to carry out the various functions described herein. Therefore, data storage 408 may include a non-transitory computer-readable medium, having stored thereon program instructions that, upon execution by computing device 400, cause computing device 400 to carry out any of the methods, processes, or functions disclosed in this specification and/or the accompanying drawings.

By way of example, program instructions 418 may include an operating system 422 (e.g., an operating system kernel, device driver(s), and/or other modules) and one or more application programs 420 (e.g., image processing, neural network or other machine learning training algorithms) installed on computing device 400.

In some examples, portions of the methods described herein could be performed by different devices, according to an application. For example, different devices of a system could have different amounts of computational resources (e.g., memory, processor cycles) and different information bandwidths for communication between the devices. Different portions of the methods described herein could be apportioned according to such considerations.

VI. EXAMPLE METHODS

Figure 5:
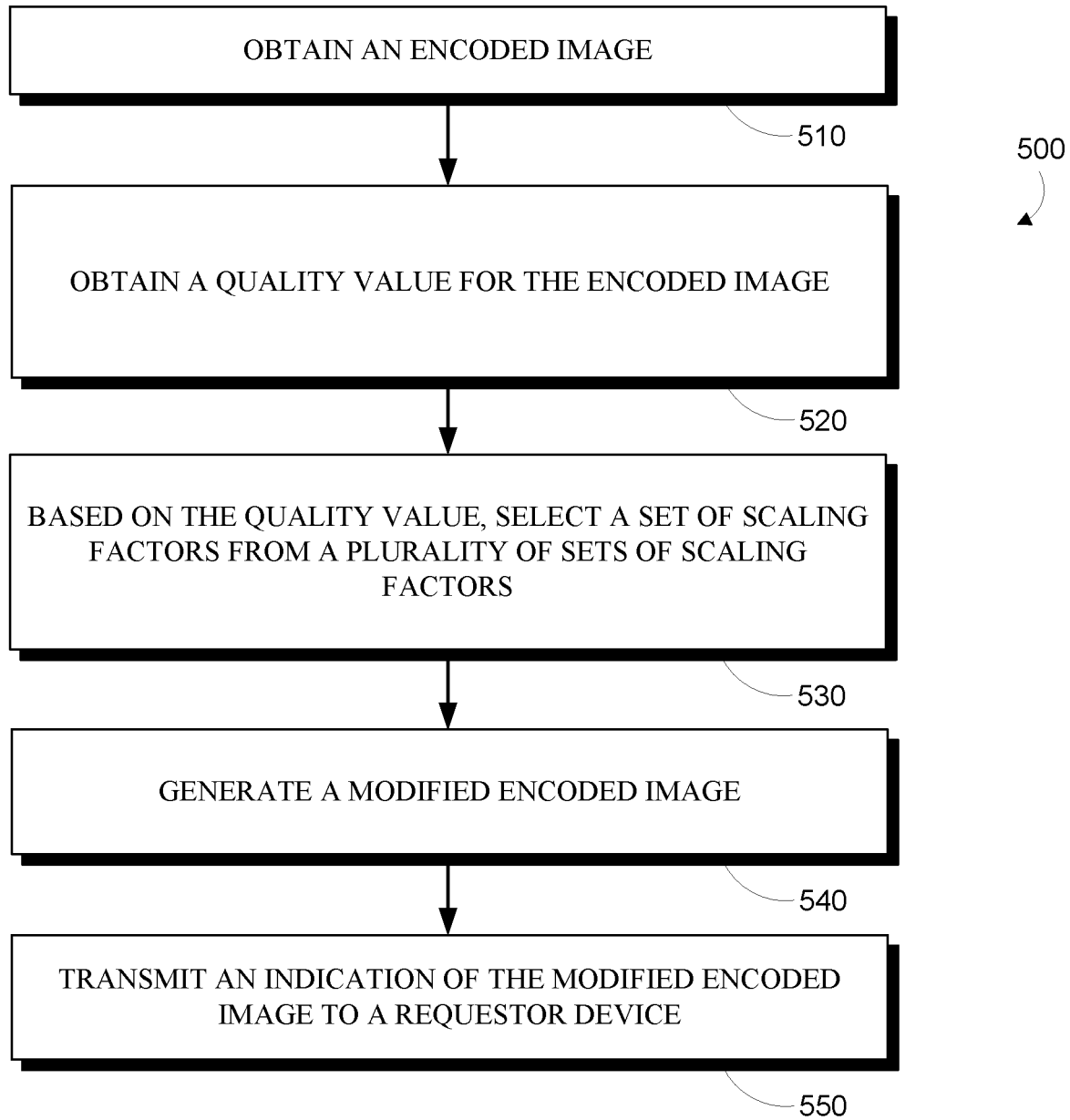
FIG. 5 is a flowchart of a method, according to an example embodiment.

FIG. 5 is a flowchart of a method 500 for efficiently improving sharpness of compressed images. The method 500 includes obtaining an encoded image (510). The encoded image includes (i) a set of coefficients indicative of image contents of the encoded image at respective spatial frequencies and (ii) a set of quantization factors indicative of the degree of scaling applied to respective coefficients of the set of coefficients. The method 500 additionally includes obtaining a quality value for the encoded image (520). This could include receiving the quality value (e.g., from a database that stores encoded images and associated quality values) or determining the quality value, e.g., based on the source of the encoded image, properties of the image encoded by the encoded image, properties of parameters of the encoded image (e.g., the quantization factors as represented by a quantization table of the encoded image), or based on some other consideration.

The method 500 yet further includes, based on the quality value, selecting a set of scaling factors from a plurality of sets of scaling factors (530). The method 500 additionally includes generating a modified encoded image (540). Generating the modified encoded image includes applying the selected set of scaling factors to scale the set of quantization factors of the encoded image. The method 500 further includes transmitting an indication of the modified encoded image to a requestor device (550).

Figure 6:
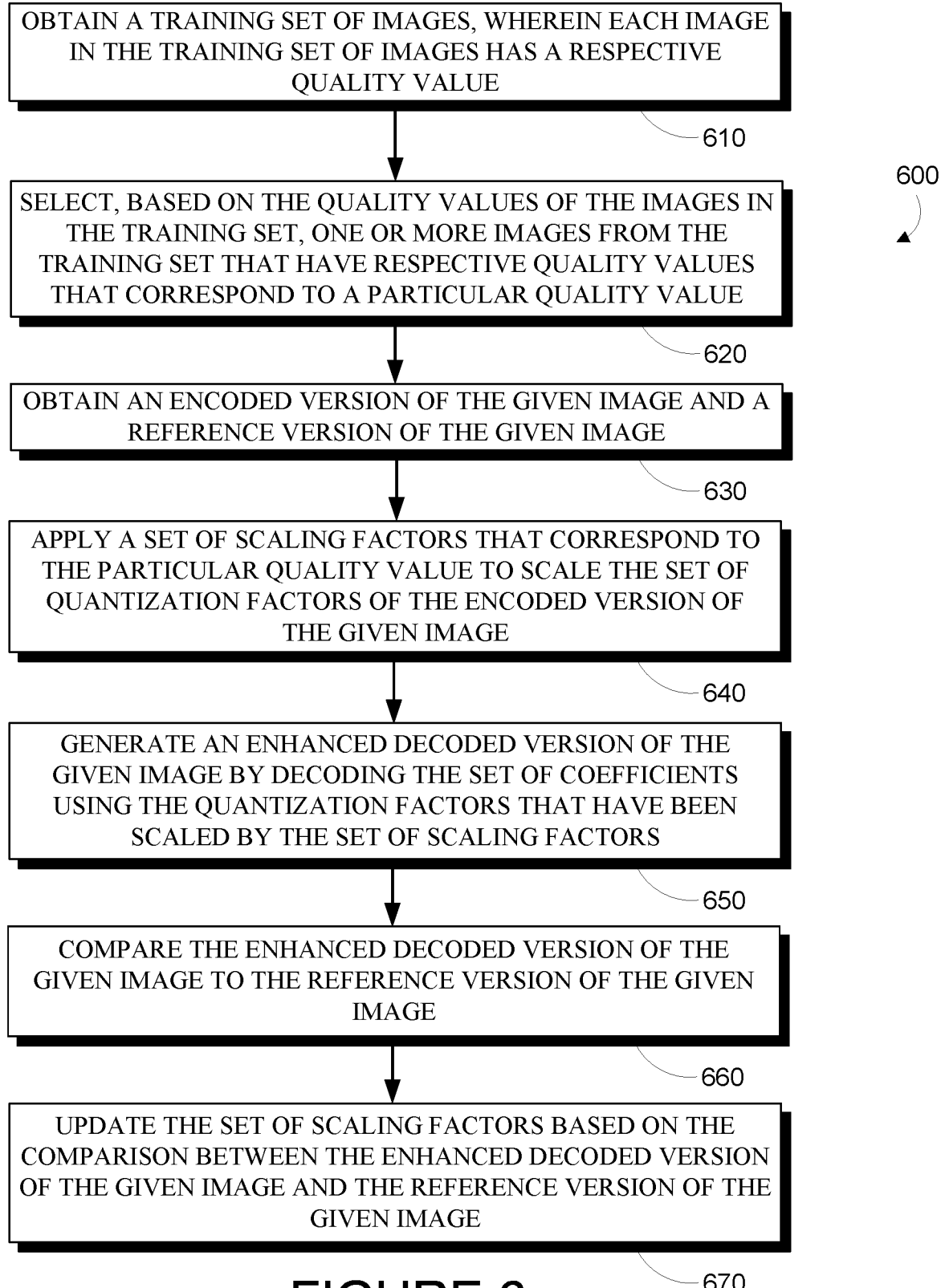
FIG. 6 is a flowchart of a method, according to an example embodiment.

FIG. 6 is a flowchart of a method 600. The method includes obtaining a training set of images, wherein each image in the training set of images has a respective quality value (610). The method 600 additionally includes selecting, based on the quality values of the images in the training set, one or more images from the training set that have respective quality values that correspond to a particular quality value (620).

The method 600 yet further includes, for each given image of the one or more images: obtaining an encoded version of the given image and a reference version of the given image (630); applying a set of scaling factors that correspond to the particular quality value to scale the set of quantization factors of the encoded version of the given image (640); generating an enhanced decoded version of the given image by decoding the set of coefficients using the quantization factors that have been scaled by the set of scaling factors (650); and comparing the enhanced decoded version of the given image to the reference version of the given image (660). The encoded version of the given image includes (i) a set of coefficients indicative of image contents of the given image at respective spatial frequencies and (ii)

a set of quantization factors indicative of the degree of scaling applied to respective coefficients of the set of coefficients.

The method 600 additionally includes updating the set of scaling factors based on the comparison between the enhanced decoded version of the given image and the reference version of the given image (670).

Either or both of the methods 500, 600 could include additional elements or features.

VII. CONCLUSION

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method for efficiently enhancing compressed images, the method comprising:
    obtaining an encoded image, wherein the encoded image comprises (i), for each respective portion of a plurality of portions of the encoded image, a set of coefficients indicative of image contents of the respective portion at respective spatial frequencies and (ii) a set of quantization factors indicative of a degree of scaling applied to respective coefficients of the set of coefficients, wherein each respective portion comprises a corresponding non-overlapping set of pixels of the encoded image;
    obtaining a quality value for the encoded image;
    based on the quality value, selecting a set of scaling factors from a plurality of sets of scaling factors, wherein the set of scaling factors comprises a plurality of scaling factors configured to (i) be applied to each respective portion of the encoded image and (ii) provide for enhancement of the encoded image, and wherein each respective scaling factor of the plurality of scaling factors corresponds to different one or more quantization factors of the set of quantization factors;
    generating an enhanced encoded image, wherein generating the enhanced encoded image comprises applying the selected set of scaling factors to scale the set of quantization factors for each respective portion of the encoded image, and wherein each respective scaling factor is applied to the corresponding different one or more quantization factors; and
    transmitting an indication of the enhanced encoded image to a requestor device.

2. The method of claim 1, wherein the set of coefficients are discrete cosine transform coefficients.

3. The method of claim 1, wherein each respective scaling factor of the plurality of scaling factors corresponds to a respective different spatial frequency associated with the corresponding different one or more quantization factors, and wherein applying the selected set of scaling factors to scale the set of quantization factors of the encoded image comprises applying each respective scaling factor of the plurality of scaling factors to the corresponding different one or more quantization factors that are associated with the spatial frequency of the respective given scaling factor.

4. The method of claim 3, wherein the plurality of scaling factors comprises fifteen scaling factors.

5. The method of claim 1, wherein obtaining a quality value for the encoded image comprises determining whether the encoded image was submitted by a user or extracted from a video.

6. The method of claim 1, wherein obtaining a quality value for the encoded image comprises determining the quality value based on the quantization factors.

7. The method of claim 1, wherein the quantization factors of the encoded image are stored in a quantization table of the encoded image.

8. The method of claim 1, wherein obtaining the encoded image comprises extracting the encoded image from a frame of a video stream.

9. The method of claim 1, wherein the encoded image is encoded according to the JPEG image compression format.

10. A method comprising:
obtaining a training set of images, wherein each image in the training set of images has a respective quality value;
selecting, based on the quality values of the images in the training set, one or more images from the training set that have respective quality values that correspond to a particular quality value;
for each given image of the one or more images:
obtaining an encoded version of the given image and a reference version of the given image, wherein the encoded version of the given image comprises (i), for each respective portion of a plurality of portions of the given image, a set of coefficients indicative of image contents of the respective portion at respective spatial frequencies and (ii) a set of quantization factors indicative of a degree of scaling applied to respective coefficients of the set of coefficients, wherein each respective portion comprises a corresponding non-overlapping set of pixels of the given image;
applying a set of scaling factors that correspond to the particular quality value to scale the set of quantization factors for each respective portion of the encoded version of the given image, wherein the set of scaling factors comprises a plurality of scaling factors, and wherein each respective scaling factor of the plurality of scaling factors (i) corresponds to different one or more quantization factors of the set of quantization factors and (ii) is applied to the corresponding different one or more quantization factors;
generating an enhanced decoded version of the given image by decoding the set of coefficients using the quantization factors that have been scaled by the set of scaling factors;
comparing the enhanced decoded version of the given image to the reference version of the given image; and
updating the set of scaling factors based on the comparison between the enhanced decoded version of the given image and the reference version of the given image.

11. The method of claim 10, further comprising:
obtaining an encoded image, wherein the encoded image comprises (i), for each respective portion of a plurality of portions of the encoded image, a set of coefficients representing image contents of the respective portion at respective spatial frequencies and (ii) a set of quantization factors indicative of a degree of scaling applied to respective coefficients of the set of coefficients of the encoded image, wherein each respective portion comprises a corresponding non-overlapping set of pixels of the encoded image, and wherein a quality value for the encoded image corresponds to the particular quality value;
generating a modified encoded image, wherein generating the modified encoded image comprises applying the updated set of scaling factors to scale the set of quantization factors for each respective portion of the encoded image, and wherein each respective scaling factor is applied to the corresponding different one or more quantization factors; and
transmitting an indication of the modified encoded image to a requestor device.

12. The method of claim 10, wherein the training set of images comprises a set of encoded images, and wherein obtaining a reference version of the given image comprises:
generating a decoded version of the given image by decoding the encoded version of the given image; and
sharpening the decoded version of the given image.

13. The method of claim 10, wherein the encoded version of the given image is encoded according to the JPEG image compression format.

14. The method of claim 10, wherein the set of coefficients of the encoded version of the given image are discrete cosine transform coefficients.

15. The method of claim 10, wherein each respective scaling factor of the plurality of scaling factors corresponds to a respective different spatial frequency associated with the corresponding different one or more quantization factors, and wherein applying the set of scaling factors that correspond to the particular quality value to scale the set of quantization factors of the encoded version of the given image comprises applying each respective scaling factor of the plurality of scaling factors to the corresponding different one or more quantization factors that are associated with the spatial frequency of the respective scaling factor.

16. A non-transitory computer-readable medium, configured to store at least computer-readable instructions that, when executed by one or more processors of a computing device, cause the computing device to perform computer operations comprising:
obtaining an encoded image, wherein the encoded image comprises (i), for each respective portion of a plurality of portions of the encoded image, a set of coefficients indicative of image contents of the respective portion at respective spatial frequencies and (ii) a set of quantization factors indicative of a degree of scaling applied to respective coefficients of the set of coefficients, wherein each respective portion comprises a corresponding non-overlapping set of pixels of the encoded image;
obtaining a quality value for the encoded image;
based on the quality value, selecting a set of scaling factors from a plurality of sets of scaling factors, wherein the set of scaling factors comprises a plurality of scaling factors configured to (i) be applied to each respective portion of the encoded image and (ii) provide for enhancement of the encoded image, and wherein each respective scaling factor of the plurality of scaling factors corresponds to different one or more quantization factors of the set of quantization factors;
generating an enhanced encoded image, wherein generating the enhanced encoded image comprises applying the selected set of scaling factors to scale the set of quantization factors for each respective portion of the encoded image, and wherein each respective scaling factor is applied to the corresponding different one or more quantization factors; and
transmitting an indication of the enhanced encoded image to a requestor device.

17. The non-transitory computer-readable medium of claim 16, wherein obtaining a quality value for the encoded image comprises determining the quality value based on the quantization factors.

18. The non-transitory computer-readable medium of claim 16, wherein the set of coefficients are discrete cosine transform coefficients.

19. The non-transitory computer-readable medium of claim 16, wherein obtaining a quality value for the encoded image comprises determining whether the encoded image was submitted by a user or extracted from a video.

20. The non-transitory computer-readable medium of claim 16, wherein the encoded image is encoded according to the JPEG image compression format.

* * * * *